UNITED STATES PATENT OFFICE.

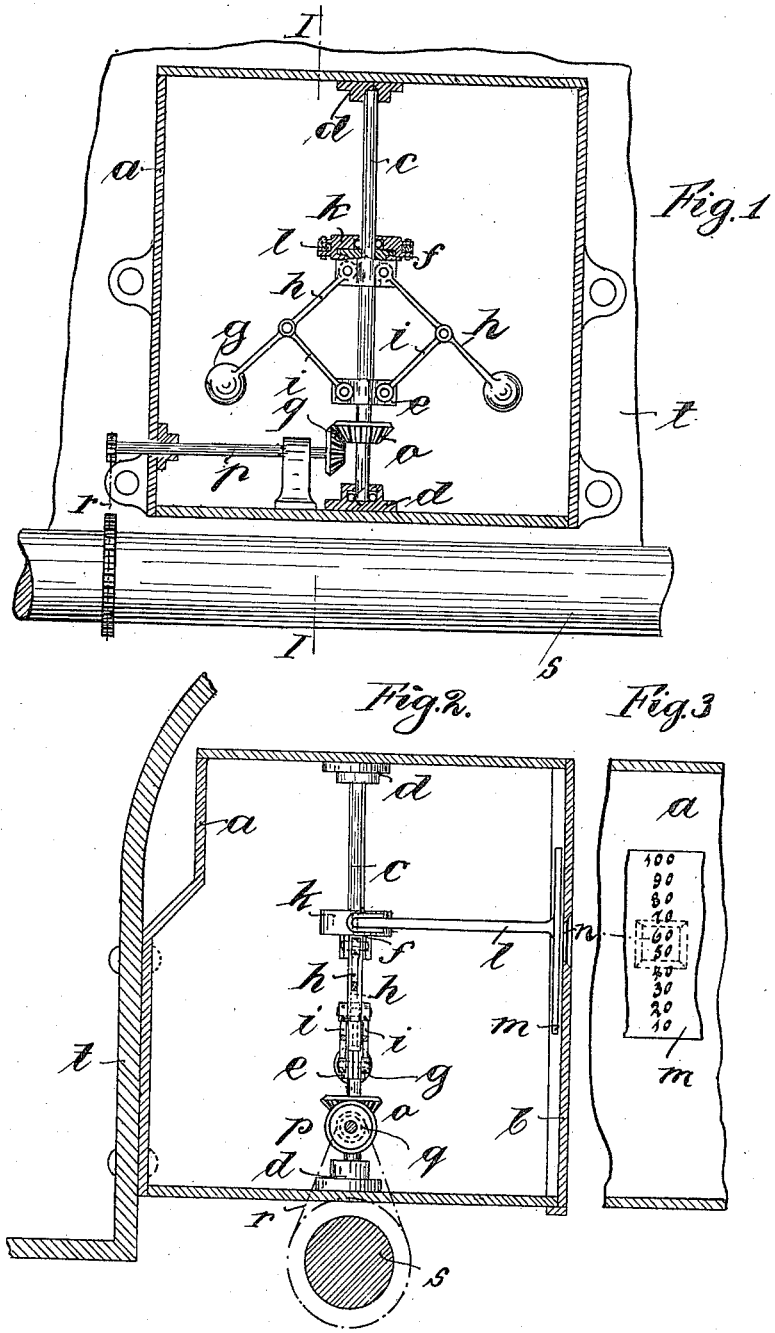

JOHANN ONKEN, OF WIEFELSTEDE, GERMANY.

SPEED-INDICATOR FOR MOTOR-CARS.

987,644.     Specification of Letters Patent.     Patented Mar. 21, 1911.

Application filed December 13, 1909. Serial No. 532,745.

*To all whom it may concern:*

Be it known that I, JOHANN ONKEN, a subject of the Grand Duke of Oldenburg, and residing at Wiefelstede, Grand Duchy of Oldenburg, Germany, have invented certain new and useful Improvements in Speed-Indicators for Motor-Cars, of which the following is a specification.

This invention relates to an improved speed indicator for motorcars which is constructed in such a manner that it indicates at the rear end of the car the speed at which the car is running, the indications being easily visible.

In the accompanying drawings the improved speed indicator is shown.

Figure 1 is a vertical section through the device which is mounted at the rear end of the car. Fig. 2 is a section on line 1—1 of Fig. 1. Fig. 3 represents the apparatus in front elevation.

The improved speed indicator is constructed as follows:—In a casing $a$ closed by a lid $b$ a vertical shaft $c$ is revolubly mounted in the bearings $d$. A sleeve $e$ is keyed and another sleeve $f$ is movably mounted on said vertical shaft $c$ and levers $h$, $h$ with centrifugal masses $g$ are hinged to the upper movable sleeve $f$, supporting arms $i$, $i$ being linked to the fixed sleeve $e$ and said levers $h$ respectively. A ring $k$ is further mounted on said shaft $c$ in such a manner, that it participates in the displacements of the movable sleeve $f$ upon said shaft. A rod $l$ is fixed with one end in said ring $k$ and carries at its other end the indicator disk $m$ which is arranged behind an opening $n$ of the lid $b$ of the casing and presents upon its front face large numbers indicating the speed of the car. If, for example, the number 50 appears in the window $n$ this indicates that the car is actually running at a speed of 50 kilometers per hour.

The vertical shaft $c$ receives its revolving motion from the driving shaft $s$ of the car by means of a transmission $r$ of convenient construction, a horizontal shaft $p$ and cog wheels $q$ and $o$, the latter being keyed upon the vertical shaft $c$.

The casing $a$ is well and securely locked and preferably mounted at the rear end $t$ of the car so that it is easily visible.

The operation of the apparatus is very simple; in accordance with the speed of the driving shaft $s$ of the car the vertical shaft of the apparatus revolves with greater or lesser speed and owing to the centrifugal force the movable sleeve $f$ and with it the ring $k$ ascends or descends upon said vertical shaft $c$ whereby the indicator disk $m$ is adjusted behind the window $n$ so that the number which appears in said window always indicates the actual speed of the car.

It is evident that the transmission between the driving shaft $s$ of the car and the vertical shaft $c$ of the apparatus has to be accurately calculated.

I claim:—

An improved speed indicator for motor-cars, comprising in combination a casing securely fixed at the proper place, the front wall of the casing having an opening, a vertical shaft revolubly mounted in said casing, a transmission connecting said vertical shaft with the driving shaft of the car, a fixed sleeve keyed upon said vertical shaft and a movable sleeve on said shaft, levers hinged at one end to said movable sleeve and centrifugal masses at the other ends of said levers, arms hinged at one end to said levers and at their other ends to said fixed sleeve, a ring loosely mounted on said vertical shaft by means of said movable sleeve so that it participates in the movements of the movable sleeve, a rod fixed at one end to said ring, and an indicator plate fixed to the other end of said rod and lying near the inner surface of the front wall of the casing so that the numbers which it has marked upon its outer face appear in said opening in the front wall, indicating the actual speed of the car, substantially as described and shown and for the purpose set forth.

In witness whereof I have hereunto set my hand in the presence of two witnesses.

JOH. ONKEN.

Witnesses:
 GERHARD STECK,
 FREDERICK HOYERMANN.